United States Patent
Ligenza

(10) Patent No.: US 10,134,168 B2
(45) Date of Patent: Nov. 20, 2018

(54) DYNAMICALLY SUPPORTING CUSTOM DEPENDENCIES DURING THREE-DIMENSIONAL CHARACTER ANIMATION

(71) Applicant: AUTODESK, INC., San Rafael, CA (US)

(72) Inventor: Krystian Ligenza, Montreal (CA)

(73) Assignee: AUTODESK, INC., San Rafael, CA (US)

( * ) Notice: Subject to any disclaimer, the term of this patent is extended or adjusted under 35 U.S.C. 154(b) by 246 days.

(21) Appl. No.: 14/229,423

(22) Filed: Mar. 28, 2014

(65) Prior Publication Data

US 2015/0279076 A1 Oct. 1, 2015

(51) Int. Cl.
*G06T 13/00* (2011.01)
*G06T 13/40* (2011.01)

(52) U.S. Cl.
CPC .................................... *G06T 13/40* (2013.01)

(58) Field of Classification Search
CPC .......................................... G06T 13/00–13/80
See application file for complete search history.

(56) References Cited

U.S. PATENT DOCUMENTS

| | | | | |
|---|---|---|---|---|
| 5,982,389 A * | 11/1999 | Guenter | ................. | G06T 13/40 345/474 |
| 6,057,859 A * | 5/2000 | Handelman | ............. | G06T 13/40 345/473 |
| 6,522,332 B1 * | 2/2003 | Lanciault | ................ | G06T 13/40 345/473 |
| 8,013,852 B2 * | 9/2011 | Ng-Thow-Hing | .......................... | G06K 9/00369 345/419 |
| 8,508,534 B1 * | 8/2013 | George | ................... | G06T 13/80 345/473 |
| 8,730,245 B2 * | 5/2014 | Lowe | ...................... | G06T 13/40 345/473 |
| 2006/0274070 A1 * | 12/2006 | Herman | .................. | A63F 13/10 345/474 |
| 2010/0123723 A1 * | 5/2010 | Collard | ................... | G06T 13/40 345/473 |
| 2010/0214313 A1 * | 8/2010 | Herman | .................. | A63F 13/10 345/593 |

* cited by examiner

*Primary Examiner* — Charles Tseng
(74) *Attorney, Agent, or Firm* — Artegis Law Group, LLP

(57) ABSTRACT

One embodiment of the present invention includes a double solve unit that configures a kinematic chain representing an animated character. The double solve unit generates a first solution for the kinematic chain based on a first solving order. While generating the first solution, the doubles solve unit determines the recursion depth of each output connector included in the kinematic chain. Subsequently, the double solve unit identifies any output connectors for which the recursion length exceeds a corresponding expected recursion depth—indicating that a custom recursive dependency exists that is not reflected in the first solution. For these custom recursive output connectors, the double solve unit creates a second solving order and generates a more accurate solution. Advantageously, identifying the custom recursive dependencies as part of the solution process enables the double solve unit to portray animated movements without incurring the quality degradation or prohibitive execution time of conventional techniques.

20 Claims, 8 Drawing Sheets

DYNAMICALLY SUPPORTING CUSTOM DEPENDENCIES DURING THREE-DIMENSIONAL CHARACTER ANIMATION

BACKGROUND OF THE INVENTION

Field of the Invention

The present invention generally relates to computer processing and, more specifically, to dynamically supporting custom dependencies during three-dimensional character animation.

Description of the Related Art

As part of animating characters for display, motion is typically conveyed through a sequential set of visual images (frames) that are relayed to a display device, such as a television or screen of a computing device. Each frame differs in a relatively minor way from the proceeding frame and, combined, the frames convey a sense of movement. However, convincingly depicting the movement of animated characters is often difficult and time-consuming. Consequently, many animators use three-dimensional (3D) character animation tools to increase the realism and decrease the design time associated with the animation process.

Some advanced 3D character animation tools enable the animator to pose and move characters using full body inverse kinematics (FBIK). In FBIK, the animator translates and rotates individual body parts, and the 3D character animation tool "solves" each frame—ensuring that the character's full body follows the animator's direction. In one approach to FBIK, the animation tool performs an initial set-up phase followed by a solving phase. During the set-up phase, the animation tool hard-codes the solving order of the object parts following biomechanical principles and observing the constraints imposed by the linkages between the parts. Subsequently, during the solving phase, the animation tool generates frames that depict the motion as constrained by the linkages.

For instance, suppose that the animator were to direct the left hand of a gorilla to grasp a banana from the ground. First, the FBIK animation tool would perform set-up operations—capturing a linkage between the left hand and the gorilla and then creating a hard-coded solving order to reflect this linkage. The 3D character animation tool would then generate a fixed number of frames based on this hard-coded solving order. These frames would convey a "natural" motion of the gorilla—such as bending the gorilla at both the waist and knees to reach the banana.

In one limitation to re-using the hard-coded solving order for multiple frames, dependencies that evolve while the animation tool is performing the solving operations may not be correctly depicted. In particular, the hard-coded solving order may incorrectly capture dynamically changing recursive custom dependencies, where one body part is constrained by another body part. For instance, suppose that, during the solving phase, the animator were to direct the gorilla to hold the banana in both hands instead of only the left-hand. Until the next set-up phase, the animation tool would continue to perform solving operations for the body of the gorilla based on the initial hard-coded solving order. Consequently, the motion of the gorilla would not accurately reflect the linkage between the left hand and the right hand, and the realism of the animation could be dramatically reduced.

To increase the realism of movements, the 3D character animation tool may be configured to perform a new set-up phase for each solving phase—re-determining the hard-coded solving order for each frame. However, typically the time required to perform set-up operations is significantly longer than the time required to perform solving operations. Thus, while increasing the ratio of set-up phases to solving phases may increase the quality of the animation, the time required to generate each frame often increases to unacceptable levels.

As the foregoing illustrates, what is needed in the art is a more effective approach to animating characters for display.

SUMMARY OF THE INVENTION

One embodiment of the present invention sets forth a computer-implemented method for configuring a kinematic chain that represents an animated character. The method includes calculating a first recursion depth associated with the kinematic chain; calculating a first output value based on a first solving order associated with the kinematic chain; determining that the first recursion depth exceeds a first base depth; in response, creating a second solving order associated with the kinematic chain; calculating a second output value based on the first output value and the second solving order; and performing one or more write operations that set a first angle in the kinematic chain based on the second output value.

One advantage of the disclosed approach is that dynamically detecting evolving dependencies enables kinematic chains to accurately and efficiently portray character movements in real-time. Notably, re-calculating output values that are compromised by the injection of custom dependencies per-frame eliminates the lag between these injected custom dependencies and the adjustment of output values that is typically exhibited by conventional techniques. Consequently, the realism of animated characters is improved compared to conventional approaches to animating characters for display.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1A:
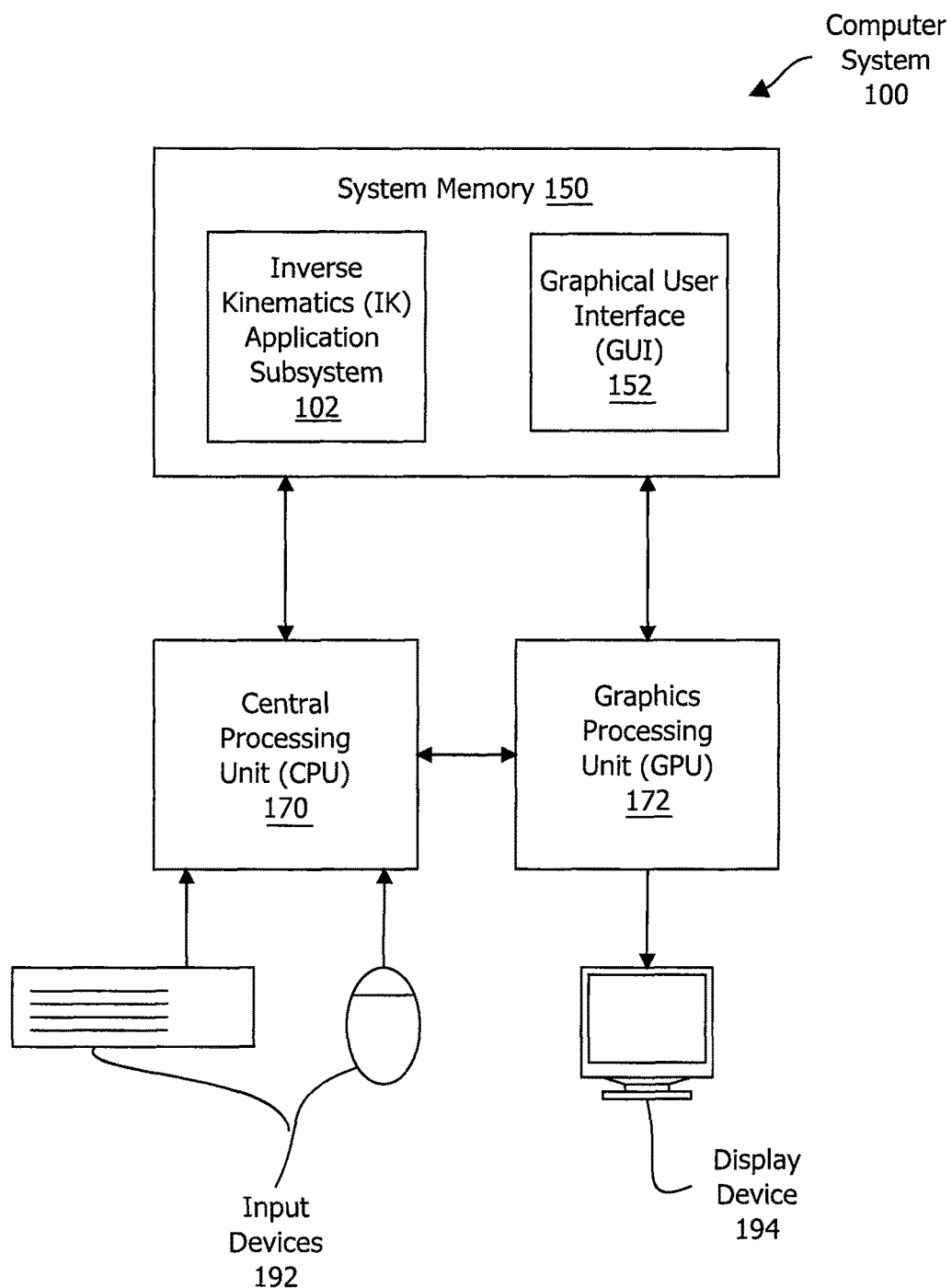
FIG. 1A is a block diagram illustrating a computer system 100 configured to implement one or more aspects of the present invention.

FIG. 1A is a block diagram illustrating a computer system 100 configured to implement one or more aspects of the present invention. As shown, the computer system 100 includes, without limitation, a central processing unit (CPU) 170, a system memory 150, a graphics processing unit (GPU) 172, input devices 192, and a display device 194.

The CPU 170 receives input user input information from the input devices 192, such as a keyboard or a mouse. In operation, the CPU 170 is the master processor of the computer system 100, controlling and coordinating operations of other system components. In particular, the CPU 102 issues commands that control the operation of the GPU 172. The GPU 172 incorporates circuitry optimized for graphics and video processing, including, for example, video output circuitry. The GPU 172 delivers pixels to the display device 194 that may be any conventional cathode ray tube, liquid crystal display, light-emitting diode display, or the like.

The system memory 150 stores content, such as software applications and data, for use by the CPU 170 and the GPU 172. As shown, the system memory 150 includes a graphical user interface (GUI) 152 and an inverse kinematics (IK) application subsystem 102. The graphical user interface (GUI) 152 is a software application that executes on the CPU 170 and provides input from animators to the IK application subsystem 102. The IK application subsystem 102 is a software application that executes on the CPU 170, the GPU 172, or any combination of the CPU 170 and the GPU 172. As described in greater detail below in FIG. 1B, the IK application subsystem 102 performs kinematic operations that enable the animators to pose and move characters using full body inverse kinematics (FBIK).

In various embodiments, GPU 172 may be integrated with one or more of other elements of FIG. 1A to form a single system. For example, the GPU 172 may be integrated with the CPU 170 and other connection circuitry on a single chip to form a system on chip (SoC). In alternate embodiments, the GPU 172 may not be included in the computer system 100. Further, in some embodiments, the GUI 152 may not be included in the computer system 100 and the functionality of the GUI 152 may be performed by any software application, such as the IK application subsystem 102, executing on the computer system 100.

In some embodiments, the IK application subsystem 102 and the GUI 154 may be provided as an application program (or programs) stored on computer readable media such as a CD-ROM, DVD-ROM, flash memory module, or other tangible storage media.

The components illustrated in the computer system 100 may be included in any type of computer system 100, e.g., desktop computers, server computers, laptop computers, tablet computers, and the like. Additionally, software applications illustrated in computer system 100 may execute on distributed systems communicating over computer networks including local area networks or large, wide area networks, such as the Internet. Notably, the IK application subsystem 102 described herein is not limited to any particular computing system and may be adapted to take advantage of new computing systems as they become available.

It will be appreciated that the computer system 100 shown herein is illustrative and that variations and modifications are possible. The number of CPUs 170, the number of GPUs 172, the number of system memories 150, and the number of applications included in the system memory 150 may be modified as desired. Further, the connection topology between the various units in FIG. 1A may be modified as desired.

Figure 1B:
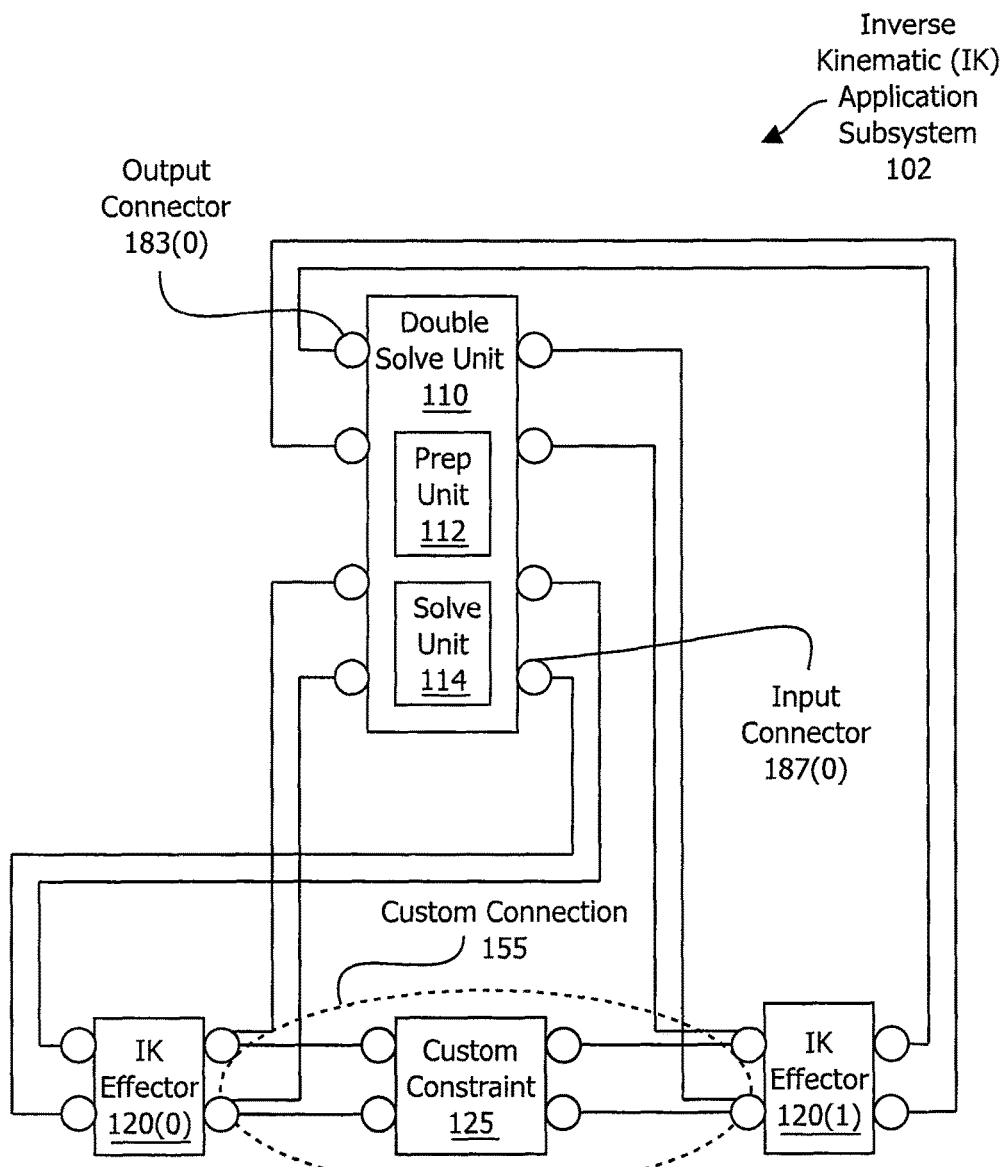
FIG. 1B is a conceptual diagram illustrating the inverse kinematic (IK) application subsystem of FIG. 1A, according to one embodiment of the present invention.

FIG. 1B is a conceptual diagram illustrating the inverse kinematic (IK) application subsystem 102 of FIG. 1A, according to one embodiment of the present invention. Again, the IK application subsystem 102 executes on the CPU 170, the GPU 172, or any combination of the CPU 170 and the GPU 172. As shown, the IK application subsystem 102 includes, without limitation, a double solve unit 110, inverse kinematic (IK) effectors 120, and a custom constraint 125. The IK application subsystem 102 is associated with a kinematic chain (also referred to herein as a skeleton) of one or more connected body parts included in an animated character, such as a gorilla.

For purposes of illustration only, FIG. 1B depicts the IK application subsystem 102 at a particular point in time. Initially, the IK application subsystem 102 does not include the custom constraint 125. After the IK application subsystem 102 processes one or more initial frames, the animator injects the custom constraint 125 into the IK application subsystem 102. Advantageously, the double solve unit 110 is configured to dynamically detect the custom constraint 125, incorporate the custom constraint 125 into the solving operations, and output animation data that reflects the custom constraint 125. By contrast, after an animator injects the custom constraint 125 into conventional IK systems, such IK systems typically output one or more frames of animation data that do not reflect the custom constraint 125.

Figure 5:
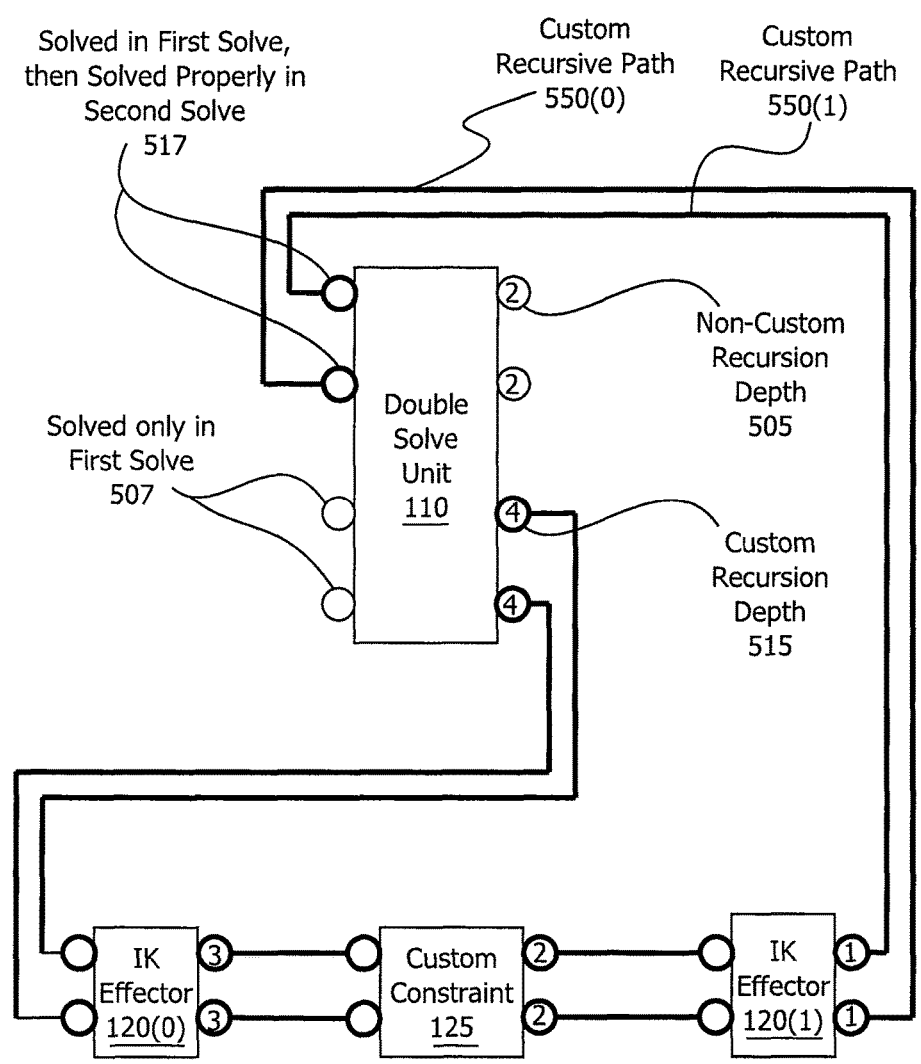
FIG. 5 is a conceptual diagram illustrating custom recursive paths identified by the double solve unit of FIG. 1B, according to one embodiment of the present invention.

Each of the double solve unit 110, the IK effectors 120, and the custom constraint 125 are driven by one or more input connectors 187 and convey results via one or more outputs connectors 183. For explanatory purposes, FIGS. 1B and 5 depict the input connectors 187 as bubbles on the right-hand side of each of the double unit 110, the IK effectors 120, and the custom constraint 125. In a complementary fashion, FIGS. 1B and 5 depict the output connectors 183 as bubbles on the left-hand side of each of the double unit 110, the IK effectors 120, and the custom constraint 125. As shown, the double solve unit 110 is driven by four input connectors 187, including the labeled input connector 187(0). The double solve unit 110 generates motion planning results via four output connectors, including the labeled output connector 183(0).

In operation, the double solve unit 110 implements forward kinematics (FK) and inverse kinematics (IK) operations to perform motion planning for the character based on the direction of an animator. In general, FK operations involve positioning individual joints in the kinematic chain associated with the IK application subsystem 102. For example, suppose that the IK application subsystem 102 were to model the skeleton of a gorilla as a kinematic chain. In such of scenario, the double solve unit 110 may implement FK operations to calculate the position of the left hand based on the position and rotation of the shoulder and elbow joints.

By contrast, IK operations involve solving for the positions of joints to achieve an IK goal, such as the position of the end of the kinematic chain. Notably, the double solve unit 110 facilitates full-body IK (FBIK). In FBIK the animator translates and rotates various body parts included in the character (such as limbs), and the double solve unit 110 applies biomechanical principles and constraints to adjust the remaining body parts in a realistic fashion. Again, suppose that the IK application subsystem 102 were to model the skeleton of a gorilla as a kinematic chain. In such a scenario, the double solve unit 110 may implement FBIK operations to translate and rotate the shoulder, elbow, hip, and knee to meet a goal of grasping a banana with the left hand.

The effectors 120 enable the animator to pose the limbs of the character represented by the IK application subsystem 102. For instance, the IK effector 120(0) may represent the position and rotation of a right wrist. Similarly, the IK effector 120(1) may represent the position and rotation of a left wrist. In alternate embodiments, the IK application subsystem 102 may include any number of additional posing mechanisms. In some alternate embodiments, the IK application subsystem 102 includes "handles" that drive the joints and bones of the character.

The custom constraint 125 is a dependency that restricts the rotation and/or translation of the body part associated with the IK effector 120(1) based on the rotation and/or translation of the body part associated with the IK effector 120(0). As shown, the custom constraint 125 is included in a custom connection 155 that links two of the output connectors 183 of the IK effector 120(1) to two of the input connector s187 of the IK effector 120(0). For example, in one embodiment, the IK effector 120(1) may represent the left wrist of the character, the IK effector 120(0) may represent the right wrist of the character, and the custom constraint 125 may specify that the right wrist remain in contract with the left wrist as the left wrist moves.

In FIG. 1B, the custom connection 155, "normal" connections, and "write-back" connections are depicted as solid lines that interconnect the double solve unit 110, the IK effectors 120, and the custom constraint 125. Normal connections link the output connectors 183 of the IK effectors 120 and the input connectors 187 of the double solve unit 110—modeling the direct dependencies in the character. By contrast, write-back connections recursively link the output connectors 183 of the double solve unit 110 to the input connectors 187 of each of the IK effectors 120. As persons skilled in the art will recognize, such recursive write-back connections enable the double solve unit 110 to efficiently perform motion planning operations.

The custom connection 155 is also recursive—linking two of the output connectors 183 of the double solve unit 110 via the IK effector 120(1), the custom constraint 125, and the IK effector 120(0) to two of the input connectors 187 of the double solve unit 110. For clarity, if the custom connection 155 is recursive, then the custom connection 155 is referred to herein as a "custom recursive connection." By contrast the write-back connections are referred to herein as "non-custom recursive connections" Further, custom connections 155 that are also recursive are included in "custom recursive paths," and write-back connections are included in "non-custom recursive paths."

In general, each recursive path begins at one of the output connectors 183 of the double solve unit 110 and ends at one of the input connectors 187 of the double solve unit 110. However, the custom recursive paths include the custom constraint 125, and the non-custom recursive paths do not include the custom constraint 125. In alternate embodiments, the IK application subsystem 102 may include any number of custom constraints 125. In such embodiments, the custom recursive paths include at least one custom constraint 125, and the non-custom recursive paths do not include any custom constraints 125.

As shown, the double solve unit 110 includes a preparation (prep) unit 112 and a solve unit 114. In operation, the IK application subsystem 102 implements a set-up phase that creates the connections and establishes a "base" solving order. The IK application subsystem 102 may conduct the set-up phase in any technically feasible fashion as known in the art. Subsequently, the preparation unit 112 and the solve unit 114 collaborate to calculate and transmit per-frame animation data for the character via the output connectors 183 of the double solve unit 110.

In conventional IK systems, after a fixed number of frames, the IK system re-conducts the set-up phase to capture any dynamically introduced constraints, such as the custom constraint 125. Consequently, conventional IK systems exhibit a lag between the introduction of custom constraints and the reflection of the custom constraints in the generated animation data. Such a lag may lead to un-realistic and/or unintended character motions. Advantageously, the IK application subsystem 102 performs only a single set-up phase. After the set-up phase, the double solve unit 110 generates sequences of frames that convey realistic motions for the character regardless of when the animator injects the custom constraint 125 into the IK application subsystem 102.

More specifically, the double solve unit 110 generates either one or two IK solutions—sets of values for the outputs connectors 183 of the double solve unit 110—per frame. As part of generating the first IK solution, the double solve unit 110 is configured to identify any custom connections 155 that are not represented by the base solving order. If the double solve unit does not identify any such custom connections 155, then the double solve unit 110 transmits the output values of the first IK solution to the output connectors 183. The double solve unit 110 then proceeds to process the next frame without generating a second IK solution for the frame.

If the double solve unit 110 identifies any custom connections 155, then the double solve unit 110 generates a second solving order that includes the custom constraint 125. Subsequently, the double solve unit 110 generates a second IK solution based on the second solving order, ensuring that the custom connections 155 are correctly processed. As part of generating the second IK solution, the double solve unit 110 re-calculates the output values of the custom recursive output connectors 183 (i.e., the output connectors 183 that are impacted by the custom connections 155).

In alternate embodiments, the double solve unit 110 may receive any type of IK, FK, or skeleton bone data via input connectors 187 and incorporate this additional data while generating the IK solutions. Further, the IK application subsystem 102 may insert any number of write-back connections between any elements, such as FK effectors and the double solve unit 110, to facilitate motion planning operations. In some embodiments, the IK application subsystem 102 may include any number of custom constraints 125, and the number and impact of the custom constraints 125 may vary throughout time in any combination.

Note that the techniques described herein are illustrative rather than restrictive, and may be altered without departing from the broader spirit and scope of the invention. In particular, the IK application subsystem 102 may be replaced by any animation system that performs kinematic operations to solve for IK goals while detecting and incorporating dynamically changing dependencies in a real-time manner.

Figure 2:
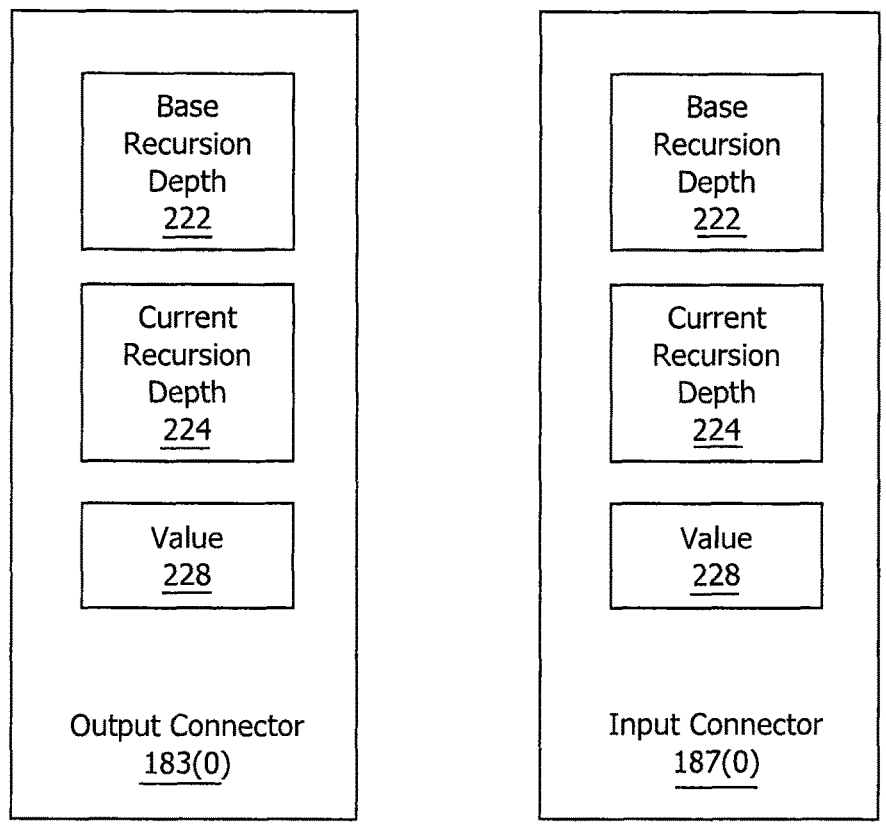
FIG. 2 is a conceptual diagram illustrating the input connector of FIG. 1B, the output connector of FIG. 1B, and a custom recursive calculation, according to one embodiment of the present invention.

FIG. 2 is a conceptual diagram illustrating the input connector 187(0) of FIG. 1B, the output connector 183(0) of FIG. 1B, and a custom recursive calculation 295, according to one embodiment of the present invention. The input connector 187(0) is representative of multiple input connectors 187 included in the IK application subsystem 102. Similarly, the output connector 183(0) is representative of multiple output connectors 183 included in the IK application subsystem 102.

As shown, both the input connector 187(0) and the output connector 183(0) include, without limitation, a base recursion depth 222, a current recursion depth 224, and a value 228. For each input connector 187, the base recursion depth 222 is the maximum length of the non-custom recursive paths between the output connectors 183 of the double solve unit 110 and the particular input connector 187. For each output connector 183, the base recursion depth 222 is the maximum length of the non-custom recursive paths between the double solve unit 110 and the particular output connector 183. Notably, the base recursion depth 222 for the output connector 183 of the double solve unit 110 equals the base recursion depth 222 for the recursively-linked input connector 187 of the double solve unit 110.

The IK application subsystem 102 may determine the base recursion depth 222 in any technically feasible fashion. For instance, the IK application subsystem 102 may determine the base recursion depth 222 as part of the set-up phase. The base recursion depth 222 does not change after the initial set-up phase and reflects the first solving order (without the custom constraint 125).

For each input connector 187, the current recursion depth 224 is the maximum length of all recursive paths—including custom recursive paths—between the output connectors 183 of the double solve unit 110 and the particular input connector 187. For each output connector 183, the current recursion depth 224 is the maximum length of all recursive paths between the double solve unit 110 and the particular output connector 183. The current recursion depth 224 for each recursive output connector 183 of the double solve unit 110 matches the current recursion depth 224 of the recursively-linked input connector 187 of the double solve unit 110.

Before the animator injects the custom constraint 125 into the IK application subsystem 102, the current recursion depth 224 of each input connector 187 and output connector 183 of the double solve unit 110 is equal to the corresponding base recursion depth 222. After the animator injects the custom constraint 125 into the IK application subsystem 102, the current recursion depth 224 of each custom recursive input connector 187 and output connector 183 of the double solve unit 110 exceeds the corresponding base recursion depth 222.

To detect custom recursive paths in real-time, the double solve unit 110 calculates the current recursion depths 224 for each frame. Advantageously, the double solve unit 110 calculates the current recursion depths 224 as part of generating the first IK solution—minimizing the number of operations devoted to determining the current recursion depths 224. In particular, as discussed in greater detail in greater detail in conjunction with FIG. 3, the double solve unit 110 performs increment operations while traversing from the output connectors 183 to input connectors 187 of the double solve unit 112. In alternate embodiments, the double solve unit 110 may calculate the current recursion depths 224 in any technically feasible fashion The custom recursive calculation 295 indicates whether a particular input connector 187 or output connector 183 of the double solve unit 110 is custom recursive. If any of the input connectors 187 or output connectors 183 of the double solve unit 110 is custom recursive, then the IK system 110 includes one or more custom constraints 125 that are not captured in the base solving order. As shown, if the current recursion depth 224 exceeds the base recursion depth 222, then the connector is custom recursive. Advantageously, the custom recursive calculation 295 enables the double solve unit 110 to dynamically detect custom recursive input connectors 187, custom recursive output connectors 183, and the associated custom recursive paths per frame.

For each of the input connectors 187 and the output connectors 183, the value 228 represents a snap-shot of the current calculations performed by the double solve unit 110. In operation, the double solve unit 110 may adjust the values 228 throughout the solving process. Consequently, each of the values 228 may represent intermediate results or final results. For instance, the value 228 of a custom recursive output connector 183 in the first IK solution does not reflect the custom constraint 125. By contrast, the value 228 of a custom recursive output connector 183 in the second IK solution accurately reflects the custom constraint 125.

In alternate embodiments, the input connectors 187 and the output connectors 183 may include any number and/or type of data that enables the double solve unit 110 to determine values and recursion depths. Further, the number and type of data include in the input connectors 187 may differ from the number and type of data included in the output connectors 183. In some embodiments, the input connectors 187 and the output connectors 183 may be heterogeneous—each tailored to a specific unit included in the IK application subsystem 102

Figure 3:
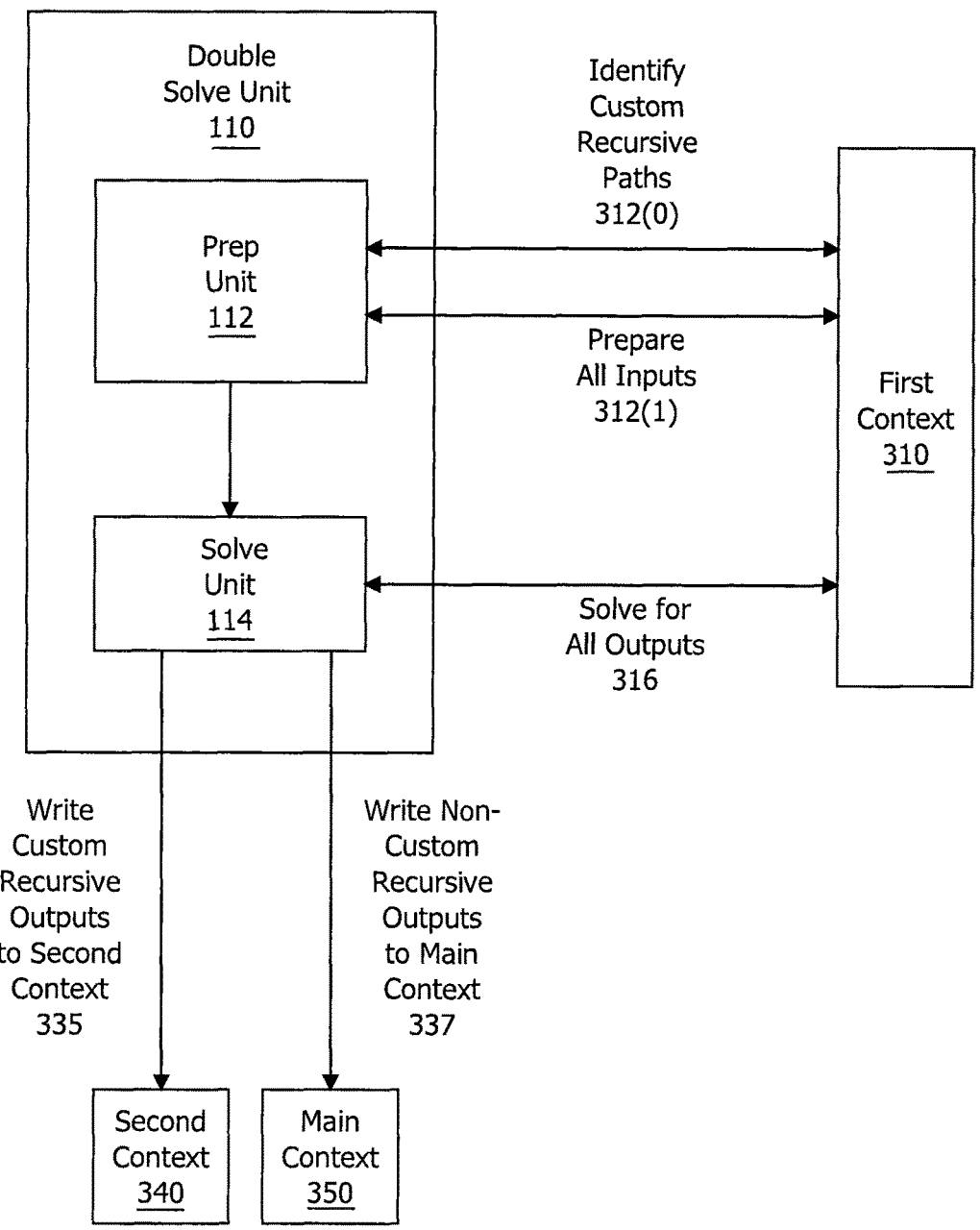
FIG. 3 is a conceptual diagram illustrating how the double solve unit of FIG. 1B may be configured to generate a first inverse kinematic (IK) solution and identify custom recursive paths, according to one embodiment of the present invention.

FIG. 3 is a conceptual diagram illustrating how the double solve unit 110 of FIG. 1B may be configured to generate a first inverse kinematic (IK) solution and identify custom recursive paths, according to one embodiment of the present invention. As outlined in conjunction with FIG. 1B, the double solve unit 110 is configured to generate a first IK solution for each frame. As part of generating the first IK solution, the double solve unit 110 also identifies any custom recursive paths included in the IK system 110.

As shown, the double solve unit 110 generates a first context 310, a second context 340, and a main context 350. In general, the double solve unit 110 may generate any number of contexts, where each context represents a different state associated with the double solve unit 110. The first context is associated with a first solving order and a first IK solution for the values of the output connectors 183, the second context 340 is associated with a second solving order, and the main context 350 is associated with a second IK solution. The main context 350 includes the final values 228 of the output connectors 183. Each context includes separate data for the input connectors 187 and the output connectors 183. Before operating on a particular context, the double solve unit 110 sets the context to a non-evaluated state.

As the part of generating the first IK solution, the preparation unit 112 operates on the first context 310—shown as "prepare all inputs" 312(1) and "identify custom recursive paths" 312(0). The preparation unit 112 may determine the values 228 of the input connectors 187 in any technically feasible fashion, such as performing evaluation operations on the IK application subsystem 102. Notably, as persons skilled in the art will recognize, preparing the input connectors 187 typically involves traversing the paths included in the IK application subsystem 102 and "visiting" each of the input connectors 187 and the output connectors 183. First, the preparation unit 112 performs an evaluation that starts at the input connectors 187 of the double solve unit 110 and finishes at the output connectors 183 of the double solve unit 110. Subsequently, the preparation unit 112 performs a propagation in the reverse direction—starting at the output connectors 183 of the double solve unit 110 and finishing at the input connectors 187 of the double solve unit 110.

During the evaluation and propagation, the double solve unit 110 determines the values 228 of the input connectors 187 in any technically feasible fashion as known in the art. In addition, during the propagation, the preparation unit 112 determines the maximum recursion depth for each input connector 187 and output connector 183 on the recursive paths. More specifically, for each output connector 183 of the double solve unit 110, the preparation unit initializes an associated propagated depth to zero. As the preparation unit 112 encounters the linked input connectors 187 during the propagation along a recursive path, the preparation unit 112 increments the propagated depth.

If the current recursion depth 224 of the linked input connector 187 does not exceed the propagated depth, then the preparation unit 112 performs write operations that update the current recursion depth 224 of the input connector 187 to the propagated depth. If the current recursion depth 224 of the linked input connector 187 exceeds the propagated depth, then the preparation unit 112 proceeds to the next input connector 187. In this fashion, the preparation unit 112 ensures that the current recursion depth 224 of each input connector 187 and output connector 183 reflects the maximum associated recursion depth. Subsequently, as outlined previously herein, the preparation unit 112 applies the custom recursive calculation 295 of FIG. 2 to each of the input connectors 187 and output connectors 183 of the double solve unit 110.

After the preparation unit 112 finishes operating on the first context 310, the solve unit 114 generates the first IK solution—shown as "solve for all outputs" 316. Notably, while the double solve unit 110 is operating on the first context 310, the solving order that reflects the custom constraint 125 is not yet known to the double solve unit 110. Although this uncertainty does not affect the validity of the values 228 of the non-custom recursive output connectors 183, this uncertainty compromises the values 228 of the custom recursive output connectors 183.

To ensure that character animation reflects the custom constraint 125 accurately, the double solve unit 110 is configured to generate a second IK solution that includes revised values 228 of the custom recursive output connectors 183. To optimize performance, since the values 228 of the non-custom recursive output connectors 183 included in the first IK solution are correct, the double solve unit 110 writes these values 228 to the main context 350 prior to generating the second IK solution. This divergence is shown as "write custom recursive outputs to second context" 335 and "write non-custom recursive outputs to main context" 337. In some embodiments, if the double solve unit 110 determines that the IK application subsystem 102 does not include any custom recursive output connectors 183, then the double solve unit 110 does not generate a second IK solution and proceeds to solve the next frame.

Figure 4:
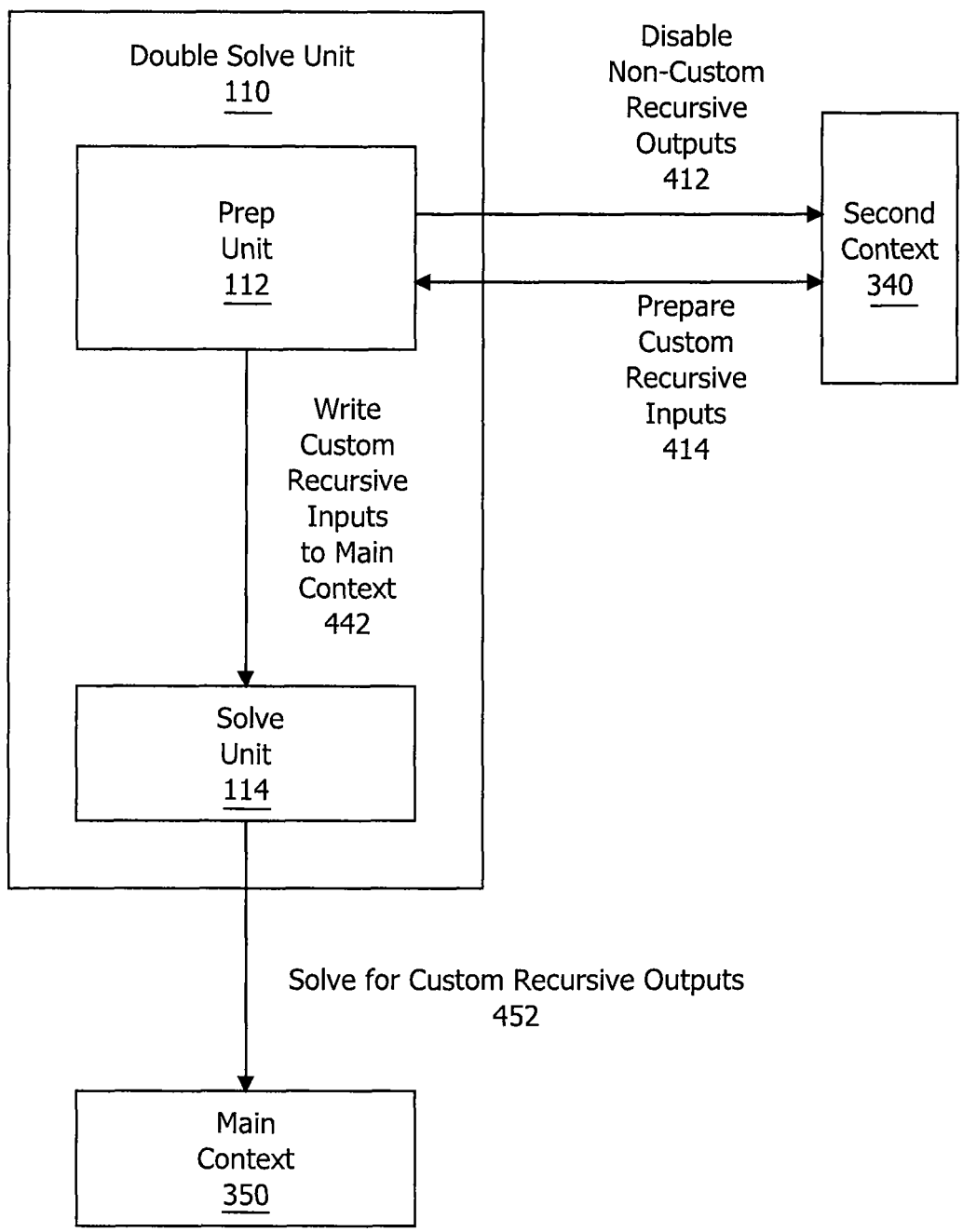
FIG. 4 is a conceptual diagram illustrating how the double solve unit of FIG. 1B may be configured to generate a second inverse kinematic (IK) solution for custom recursive output connectors, according to one embodiment of the present invention.

FIG. 4 is a conceptual diagram illustrating how the double solve unit 110 of FIG. 1B may be configured to generate a second inverse kinematic (IK) solution for custom recursive output connectors 183, according to one embodiment of the present invention. As outlined previously herein, the double solve unit 110 is configured to generate a second IK solution for each frame that includes custom recursive output connectors 183.

As outlined in conjunction with FIG. 3, as part generating the first IK solution, the double solve unit 110 writes the non-final values 228 of the custom recursive output connectors 183 to the second context 340. Advantageously, the preparation unit 110 leverages these values 228 while evaluating a second solving order that correctly reflects the custom constraint 125. To create the second solving order, the preparation unit 110 disables the non-custom recursive output connectors 183 (shown as "disable non-custom recursive outputs" 412) in the second context 340. Such an operation filters the write-back recursive paths, exposing the custom recursive paths and enabling the double solve unit 110 to properly solve for the custom recursive outputs connectors 183.

After disabling the non-custom recursive output connectors 183, the preparation unit 100 calculates values 228 for the custom recursive input connectors 187 based on the previously calculated values for the custom recursive output connectors 183 and the second solving order. This is depicted in FIG. 2 as "prepare the custom recursive inputs" 414. The preparation unit 112 may determine the values 228 for the custom recursive input connectors 187 in any technically feasible fashion. Advantageously, because the second solving order follows the custom recursive paths, the values 228 for the custom recursive input connectors 187 in the second context 340 reflect the custom constraint 125.

After the preparation unit 112 re-calculates the values 228 of the custom recursive input connectors 197, the preparation unit 112 performs write operations that copy the values 228 of the custom recursive input connectors 187 in the second context 340 to the main context 350. This operation is shown as "write custom recursive inputs to main context" 442 in FIG. 4. The solve unit 114 then operates on the main context 350, generating a second IK solution—"solve for custom recursive outputs" 452—that includes valid values 228 for each of the custom recursive output connectors 183. In this fashion, the main context 350 includes correct values 228 for the non-custom recursive output connectors 183 based on the first IK solution as well as correct values 228 for the custom recursive output connectors 183 based on the second IK solution.

FIG. 5 is a conceptual diagram illustrating custom recursive paths 550 identified by the double solve unit 110 of FIG. 1B, according to one embodiment of the present invention. For explanatory purposes only, FIG. 5 depicts the custom recursive path 550(0) and the custom recursive path 550(1) that the double solve unit 110 traces as part of generating the second IK solution detailed in conjunction with FIG. 4.

As shown, the custom recursive path 550(0) is a dependency path that connects one of the output connectors 183 of the double solve unit 110 recursively to one of the input connectors 187 of the double solve unit 110. Similarly, the custom recursive path 550(1) is a dependency path that connects another of the output connectors 183 of the double solve unit 110 recursively to another of the input connectors 187 of the double solve unit 110. Further both of the custom recursive paths 550(0) and 550(1) pass through the IK effector 120(1), the custom constraint 125, and the IK effector 120(0) before returning to the double solve unit 110. Consequently, for each of the two custom recursive input connectors 187 of the double solve unit 110, the current recursion depth 224 is four—labeled as the custom recursion depth 515. By contrast, the upper two input connectors 187 of the double solve unit 110 are non-recursive input connectors 187. For each of these non-recursive input connectors 187 the current recursion depth 224 is two—labeled as the non-custom recursion depth 505.

As also shown, for each of the input connectors 187, the current recursion depth 224 is annotated inside the bubble representing the input connector 187. Each of the current recursion depths 224 included in the custom recursive input connectors 187 of the IK effector 120(0) is three. Each of the current recursion depths 224 included in the custom recursive input connectors 187 of the custom constraint 125 is two. Finally, each of the current recursion depths 224 included in the custom recursive input connectors 187 of the IK effector 120(1) is one.

As previously described herein, the non-custom recursive output connectors 183 of the double solve unit 110 are "solved only in the first solve" 507. By contrast, the custom recursive output connectors 183 of the double solve unit 110 are "solved in first solve, then solve properly in second solve" 517. Since the double solve unit 110 only generates a second IK solution in response to the injection of the custom constraint 125, the double solve unit 110 optimizes the number of IK solutions required to accurately portray character movements.

Figure 6A:
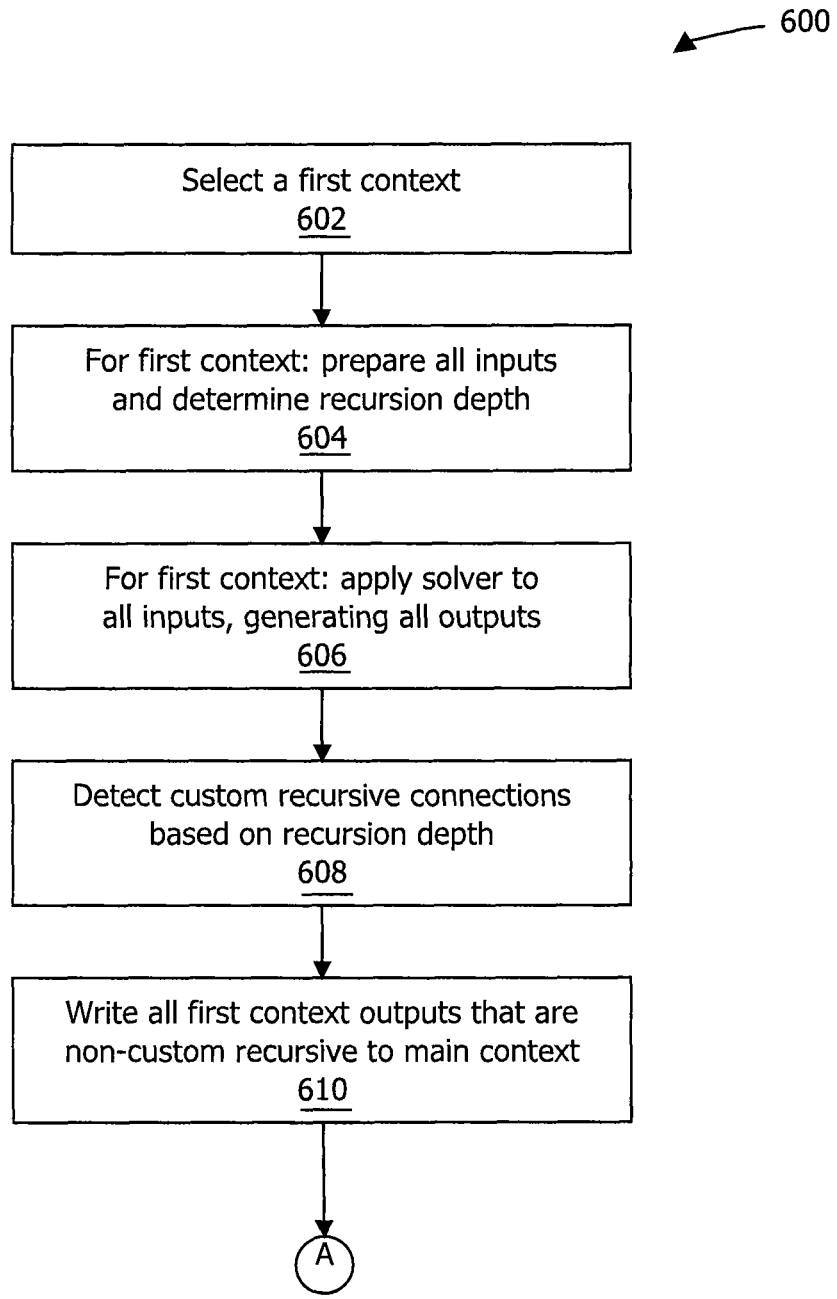
FIGS. 6A-6B set forth a flow diagram of method steps for configuring a kinematic chain that represents an animated character to achieve an inverse kinematic goal in the presence of dynamically changing constraints, according to one embodiment of the present invention.
Figure 6B:
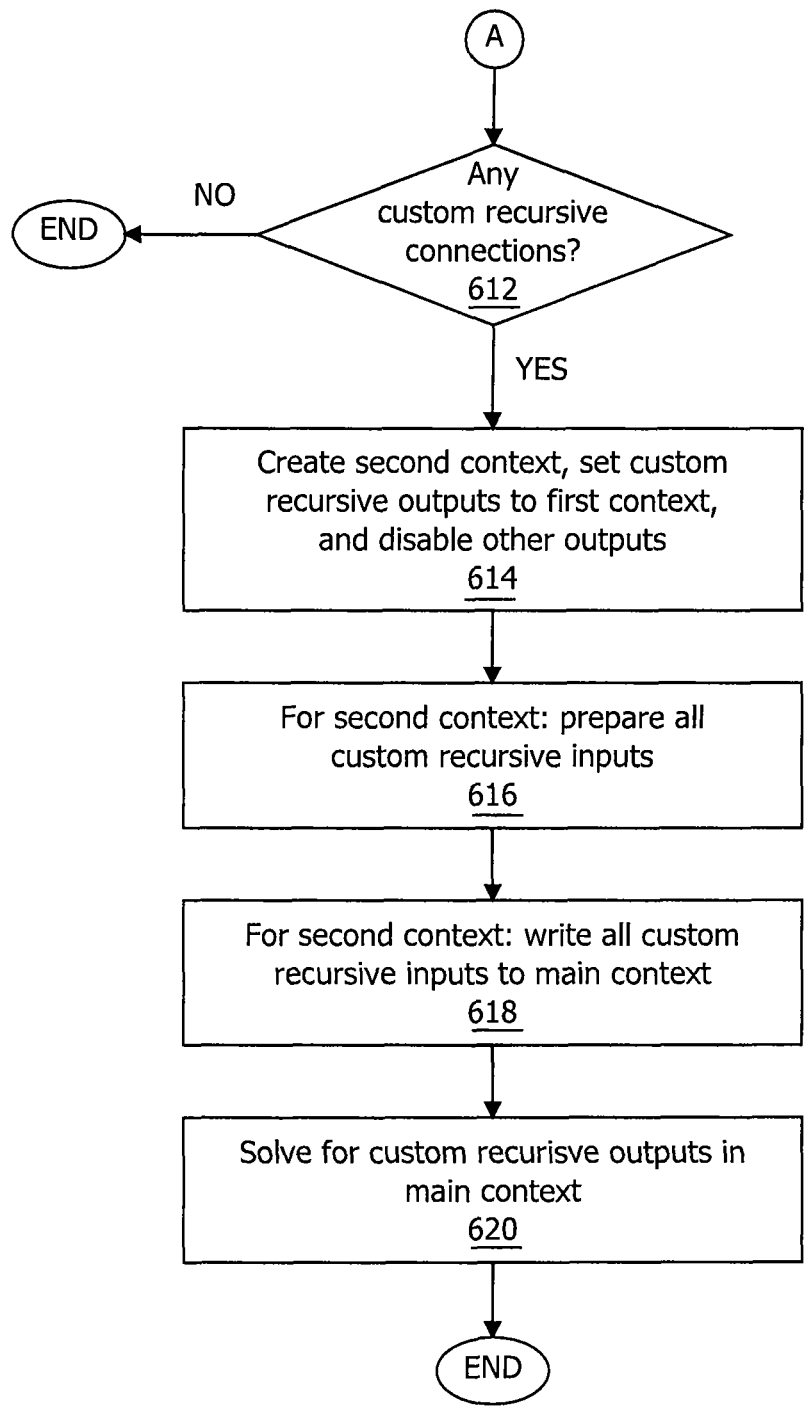

FIGS. 6A-6B set forth a flow diagram of method steps for configuring a kinematic chain that represents an animated character to achieve an inverse kinematic goal in the presence of dynamically changing constraints, according to one embodiment of the present invention. Although the method steps are described in conjunction with the systems of FIGS. 1-5, persons skilled in the art will understand that any system configured to implement the method steps, in any order, falls within the scope of the present invention.

As shown, a method 600 begins at step 602, where the double solve unit 110 generates and initializes a first context 310 for a frame. At step 604, for the first context, the preparation unit 112 calculates the values 228 for the input connectors 187. As part of step 604, the preparation unit 112 also calculates the current recursion depths 224 for the input connectors 187 and the output connectors 183 of the double solve unit 110. At step 606, for the first context, the solve unit 114 operates on the values 228 of the input connectors 187, generating values 228 for the output connectors 183.

As step 608 the preparation unit 112 determines whether each of the input connectors 187 and the output connectors 183 of the double solve unit 110 are custom recursive. As part of step 608, for each input connector 187 of the double solve unit 110, the preparation unit 112 compares the current recursion depth 224 to the base recursion depth 222 that is associated with an existing, base solving order. If the current recursion depth 224 exceeds the corresponding base recursion depth 222, then the input connector 187 is a custom recursive input connector. Similarly, for each output connector 183, the preparation unit 112 compares the current recursion depth 224 to the base recursion depth 222 that is associated with the base solving order. If the current recursion depth 224 exceeds the corresponding base recursion depth 222, then the output connector 183 is a custom recursive output connector 183. In alternate embodiments, the preparation unit 112 may identify the custom recursive input connectors 187 and the custom recursive output connectors 183 in any technically feasible fashion.

At step 610, the double solve unit 110 performs one or write operations that copy the values 228 of the non-custom recursive output connectors 183 from the first context 310 to the main context 350 of the frame. The double solve unit 110 does not update the values 228 of the custom recursive output connectors 183 in the main context 350. If, at step 612, the double solve unit 110 determines that there are no custom recursive output connectors 183, then the double solve unit 110 recognizes that all of the values 228 of the custom reclusive output connectors 183 are valid, and the method 600 terminates.

At step 612, if the double solve unit 110 determines that there are one or more custom recursive output connectors 183, then the method 600 proceeds to step 614. At step 614, the double solve unit 110 creates and initializes a second context 340 for the frame. As part of the initialization, the double solve unit 110 performs write operations that copy the values 228 of the custom recursive output connectors 183 from the first context 310 to the second context 340. Further, the double solve unit 110 disables the non-custom recursive output connectors 183 in the second context 340. Advantageously, disabling the non-custom recursive output connectors 183 creates a second solving order that reflects the custom injected constraints 125 that were not reflected in the first context 310.

At step 616, for the second context 340, the preparation unit 112 calculates the values 228 for the custom recursive input connectors 187. The preparation unit 112 may determine the values 228 for the custom recursive input connectors 187 in any technically feasible fashion. Advantageously, since the second context 340 reflects the second solving order, the values 228 of the custom recursive input connectors 187 reflect the custom injected constraints 125.

At step 618, the double solve unit 110 performs one or more write operations that copy the values 228 of the custom recursive input connectors 187 from the second context 340 to the main context 350. The double solve unit 110 does not update the values 228 of the non-custom recursive input connectors 187 in the main context 350. At step 620, for the main context 350, the solve unit 114 performs one or more inverse kinematic operations on the values 228 of the custom recursive input connectors 187, generating values 228 for the custom recursive output connectors 183. In this fashion, the main context 350 includes the values 228 of the non-custom recursive output connectors 183 from the first context 310 and the values 228 of the custom recursive output connectors 183 based on the custom input connectors 187 of the second context 350. The method 600 then terminates.

In sum, a double solve unit implements techniques that support dynamic dependencies during 3D character animation. The double solve unit includes a preparation unit and a solve unit that, together, ensure that any changes in dependencies in an inverse kinematic (IK) system are reflected in the movements of animated characters. In operation, the preparation unit first evaluates the IK system. During this evaluation process, the preparation unit determines the values of the inputs to the solve unit and, at least partially in parallel, calculates the recursion depths (i.e., the length of IK components from outputs of the double solve unit to inputs of the double solve unit). Subsequently, the double solve unit operates on the determined values of the inputs, generating a first calculated value for each output—a first IK solution.

For each output, the double solve unit compares the calculated recursion depth to a base recursion depth that reflects an initial set of dependencies included in the IK system. If the double solve unit determines that the calculated recursion depth does not exceed the base recursion depth, then the double solve unit sets the particular output to the first calculated value. By contrast, if the calculated recursion depth exceeds the base recursion depth, then the double solve unit identifies the particular output as a custom recursive output and discards the first calculated value. If any of the outputs are customer recursive outputs, then the double solve unit disables the non-recursive outputs to change the solving order. The solve unit then generates a second 1K solution—operating on re-determined values of the inputs to compute the final value for each custom recursive output. Notably, if none of the outputs are custom recursive outputs, then the first calculated value for each output correctly captures the dependencies, and the solve unit does not generate a second IK solution.

Advantageously, detecting recursive customer dependencies as part of the solving process enables the double solve unit to accurately and efficiently perform character animation in the presence of evolving constraints. Because the double solve detects and responds to custom recursive dependencies per frame, the generated character movements correctly reflect the real-time dependencies. By contrast, conventional animation tools that re-use a single hard-coded solving order for multiple frames do not necessarily appropriately represent dependencies that change during a solve phase. Further, if the double solve unit does not detect any custom recursive dependencies in a particular frame, then the double solve unit does not generate the second, unnecessary, IK solution. In this fashion, the double solve unit optimizes the time required to properly solve for each frame.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A computer-implemented method for configuring a kinematic chain that represents an animated character, the method comprising:
    calculating a first recursion depth value associated with the kinematic chain, wherein the first recursion depth value represents a maximum length of a plurality of recursion paths;
    calculating a first output value based on a first solving order associated with the kinematic chain;
    identifying, based on the first recursion depth value, a first custom connection not included in the first solving order;
    in response, creating a second solving order associated with the kinematic chain, wherein the second solving order includes the first custom connection;
    calculating a second output value based on the first output value and the second solving order;
    performing one or more write operations that set a first angle in the kinematic chain based on the second output value; and
    generating animation data associated with the animated character based on the first angle in the kinematic chain.

2. The method of claim 1, wherein the kinematic chain includes a first recursive dependency path; the first output value does not correlate to the first recursive dependency path; and the second output value correlates to the first recursive dependency path.

3. The method of claim 1, further comprising:
    calculating a second recursion depth value;
    calculating a third output value based on the first solving order;
    determining that the second recursion depth value does not exceed a second base depth value; and
    in response, performing one or more write operations that set a second angle in the kinematic chain based on the third output value.

4. The method of claim 3, wherein the kinematic chain includes both a first recursive dependency path and a second recursive dependency path; the first output value correlates to neither the first recursive dependency path nor the second recursive dependency path; the second output value correlates to the first recursive dependency path; and the third output value correlates to the second recursive dependency path.

5. The method of claim 3, wherein the second output value is not based on the third output value.

6. The method of claim 1, wherein creating the second solving order comprises disabling a first output connector included in the kinematic chain.

7. The method of claim 1, wherein calculating the first output value comprises applying one or more inverse kinematics operations to a first input value based on the first solving order.

8. The method of claim 1, wherein calculating the first recursion depth value comprises determining the length of a recursive dependency path from a first output connector to a first input connector.

9. The method of claim 1, wherein the first recursion depth value is determined at least partially in parallel to calculating the first output value.

10. A non-transitory computer-readable storage medium including instructions that, when executed by a processor, cause the processor to configure a kinematic chain that represents an animated character by performing the steps of:

calculating a first recursion depth value associated with the kinematic chain, wherein the first recursion depth value represents a maximum length of a plurality of recursion paths;

calculating a first output value based on a first solving order associated with the kinematic chain;

identifying, based on the first recursion depth value, a first custom connection not included in the first solving order;

in response, creating a second solving order associated with the kinematic chain, wherein the second solving order includes the first custom connection;

calculating a second output value based on the first output value and the second solving order;

performing one or more write operations that set a first angle in the kinematic chain based on the second output value; and generating animation data associated with the animated character based on the first angle the kinematic chain.

11. The non-transitory computer-readable storage medium of claim 10, wherein the kinematic chain includes a first recursive dependency path; the first output value does not correlate to the first recursive dependency path; and the second output value correlates to the first recursive dependency path.

12. The non-transitory computer-readable storage medium of claim 10, further comprising:

calculating a second recursion depth value;

calculating a third output value based on the first solving order;

determining that the second recursion depth value does not exceed a second base depth value; and in response, performing one or more write operations that set a second angle in the kinematic chain based on the third output value.

13. The non-transitory computer-readable storage medium of claim 12, wherein the kinematic chain includes both a first recursive dependency path and a second recursive dependency path; the first output value correlates to neither the first recursive dependency path nor the second recursive dependency path; the second output value correlates to the first recursive dependency path; and the third output value correlates to the second recursive dependency path.

14. The non-transitory computer-readable storage medium of claim 12, wherein the second output value is not based on the third output value.

15. The non-transitory computer-readable storage medium of claim 10, wherein creating the second solving order comprises disabling a first output connector included in the kinematic chain.

16. The non-transitory computer-readable storage medium of claim 10, wherein calculating the first output value comprises applying one or more inverse kinematics operations to a first input value based on the first solving order.

17. The non-transitory computer-readable storage medium of claim 10, wherein calculating the first recursion depth value comprises determining the length of a recursive dependency path from a first output connector to a first input connector.

18. The non-transitory computer-readable storage medium of claim 10, wherein the first recursion depth value is determined at least partially in parallel to calculating the first output value.

19. A system configured to characterize a kinematic chain that represents an animated character, the system comprising:

a memory that includes an inverse kinematics application; and a processing unit coupled to the memory and configured to execute the inverse kinematics application and:

calculate a first recursion depth value associated with the kinematic chain, wherein the first recursion depth value represents a maximum length of a plurality of recursion paths;

calculate a first output value based on a first solving order associated with the kinematic chain;

identifying, based on the first recursion depth value, a first custom connection not included in the first solving order;

in response, create a second solving order associated with the kinematic chain, wherein the second solving order includes the first custom connection;

calculate a second output value based on the first output value and the second solving order;

perform one or more write operations that set a first angle in the kinematic chain based on the second output value; and generate animation data associated with the animated character based on the first angle the kinematic chain.

20. The system of claim 19, wherein the kinematic chain includes a first recursive dependency path; the first output value does not correlate to the first recursive dependency path; and the second output value correlates to the first recursive dependency path.

* * * * *